United States Patent [19]

Filas et al.

[11] Patent Number: 5,703,979
[45] Date of Patent: Dec. 30, 1997

[54] CYLINDRICAL FIBER PROBE DEVICES

[75] Inventors: Robert William Filas, Bridgewater; Herschel Maclyn Marchman, New Providence, both of N.J.

[73] Assignee: Lucent Technologies Inc., Murray Hill, N.J.

[21] Appl. No.: 548,924

[22] Filed: Oct. 26, 1995

Related U.S. Application Data

[60] Division of Ser. No. 246,523, May 20, 1994, Pat. No. 5,531,343, which is a continuation-in-part of Ser. No. 173,298, Dec. 22, 1993, abandoned, which is a continuation-in-part of Ser. No. 91,808, Jul. 15, 1993, abandoned.

[51] Int. Cl.$^6$ .................................................. G02B 6/26
[52] U.S. Cl. .......................... 385/43; 385/123; 65/429; 216/11
[58] Field of Search .................. 385/12, 43, 117, 385/123, 142, 902; 65/429; 359/368; 250/216, 227.13; 428/392, 397, 399; 216/11

[56] References Cited

U.S. PATENT DOCUMENTS 4,604,520  8/1986  Pohl ............................ 250/216
5,018,865  5/1991  Ferrell et al. .................. 356/376
5,272,330  12/1993  Betzig et al. .................. 250/216
5,394,500  2/1995  Marchman .................... 385/43 X

OTHER PUBLICATIONS

Wickramasinghe, H. K., "Scanned–Probe Microscopes," *Scientific American*, vol. 261, No. 4, pp. 98–105 (Oct. 1989).
Binnig, G. et al., "Atomic Force Microscope," *Phys. Rev. Lett.*, vol. 56, No. 9, Mar. 3, 1986, pp. 930–933.
Pangaribuan, T. et al., "Reproducible Fabrication Technique of Nanometric Tip Diameter Fiber Probe For Photon Scanning Tunneling Microscope," *Japan Journal Applied Physics*, vol. 31 (1992), pp. L 1302–L 1304, Part 2, No. 9A, 1 Sep. 1992.

*Primary Examiner*—Phan T. H. Palmer
*Attorney, Agent, or Firm*—David I. Caplan

[57] ABSTRACT

This invention involves a fiber probe device and a method of making it. The probe includes a relatively thick upper cylindrical region, typically in the form of a solid right circular cylinder, terminating in a tapered region that terminates in a relatively thin lower cylindrical region (tip), typically also in the form of a solid right circular cylinder, the lower region having a width (diameter) in the approximate range 0.01 µm to 150 µm.

14 Claims, 2 Drawing Sheets

CYLINDRICAL FIBER PROBE DEVICES

CROSS-REFERENCE TO RELATED APPLICATIONS

This is a division of application Ser. No. 08/246,523 filed May 20, 1994, U.S. Pat. No. 5,531,343, hereby incorporated by reference herein, which application is a Continuation-in-Part of Marchman 2, application Ser. No. 08/173,298 filed Dec. 22, 1993, now abandoned, which is a Continuation-In-Part of Marchman, 1, application Ser. No. 08/091,808, filed Jul. 15, 1993, now abandoned, both of which are incorporated herein by reference.

TECHNICAL FIELD

This invention relates to probe devices, and more particularly to metrological fiber probe devices and to methods of making and using them.

BACKGROUND OF THE INVENTION

More than 100 years ago, the famous physicist Ernst Abbe described a fundamental limitation of any microscope that relies on any lens or system of lenses in an imaging system to focus light or other radiation: diffraction obscures (makes fuzzy) those details of the image that are smaller in size than approximately one-half the wavelength of the radiation. See "Scanned-Probe Microscopes" by H. Kumar Wickramasinghe, published in *Scientific American*, Vol. 261, No. 4, pp. 98–105 (October 1989). In other words, the resolution of the microscope is limited by the wavelength of the radiation. In order to circumvent this limitation, researchers have investigated the use of, inter alia, various types of imaging probes. Scanning tunneling microscopy (hereinafter "STM") devices, atomic force microscopy (hereinafter "AFM") devices, and near-field scanning optical microscopy (hereinafter "NSOM") are some examples of different types of probe microscopes.

In STM, a metallic probe is brought sufficiently close to a conducting sample surface such that a small tunneling current is established. The magnitude of this current is extremely dependent on the tip-to-sample distance (i.e., topography of the sample surface). The tip is allowed to scan laterally across the (irregular) surface of the sample body with several angstroms separation between tip and sample in order to achieve imaging with atomic-scale resolution. The tunneling current, and hence the tip-to-sample separation, is detected and controlled by an electromechanical feedback servomechanism. In AFM, imaging is achieved in a similar manner to that of the STM except that the atomic forces (either short-range repulsive or long-range attractive) are detected instead of tunneling current. An obvious advantage to this technique is that the tip and sample do not have to be conductive (all materials exert atomic forces).

An NSOM device is typically comprised of an aperture located at the tip of an elongated optical probe, the aperture having a (largest) dimension that is smaller than approximately the wavelength of the optical radiation that is being used. During device operation, the probe is positioned in close proximity to the surface of a sample body. The aperture of the probe is then allowed to scan across the surface of the sample body at distances of separation therefrom all of which distances are characterized by mutually equal forces components exerted on the probe device in the direction perpendicular to the global (overall) surface of the sample body, the scanning being detected and controlled by an electromechanical feedback servomechanism as was the case in STM and AFM.

For example, U.S. Pat. No. 4,604,520, describes, inter alia, a probe device having an aperture located at the tip of a cladded glass fiber that has been coated with a metallic layer. The aperture is drilled into the metallic layer at the tip of the fiber at a location that is coaxed with the fiber. The (immediate) neighborhood of the tip is composed of a section of solid glass fiber that has obliquely sloping (truncated conical) sidewalls, whereby the sidewalls do not form a cylinder of any kind. Therefore, as the probe device laterally scans a rough surface, the calculations required to determine the desired information on the actual contours (actual profile) of the surface of the sample body require prior detailed knowledge of the slanting contours of the sidewalls of the probe, and these calculations typically do not yield accurate metrological determinations of the desired profile of the contours of the surface of the sample body, especially at locations of the surface of the sample body where sudden jumps (vertical jumps) thereof are located. In addition, fabrication of the probe device is complex and expensive, especially because of the need for drilling the aperture coaxially with the fiber.

Another example involves the fabrication of nanometric tip diameter fiber probes for photon tunneling microscopes ("PSTM") by selective chemical etching of the $GeO_2$-doped cores of optical fibers. See "Reproducible Fabrication Technique of Nanometric Tip Diameter Fiber Probe for Photon Scanning Tunneling Microscope", Togar Pangaribuan, et al., *Japan Journal Applied Physics*, Vol. 31 (1992), pp. L 1302–L 1304. By selectively etching the $GeO_2$ doped regions of the fiber, a tapered tip having the shape of a small cone can be formed on the endface of the optical fiber. The cone angle of the fiber probe tip is controlled by varying the doping ratio of the fiber core and the composition of the etching solution. A fiber probe with a cone angle of 20° and tip diameter of less than 10 nm was fabricated. Only probes having conical-shaped endfaces can be made with this technique, so that the sidewalls do not form a cylinder of any kind. The scanning range of such a probe is undesirably limited owing to the relatively large width (diameter) of the endface on which the relatively short-width conical tip is centered, coupled with the fact that, during scanning, the probe is rastered from side-to-side in an arc: a desired large length of scan is attempted, the corners of the probe's endface undesirably will make contact with the sample surface. In addition, the conical shape of the tip undesirably limits the accuracy of measurements wherever the surface being probed has a sudden jump.

SUMMARY OF THE INVENTION

This invention involves, in a specific device embodiment, a probe device, that can be used for surface metrology (for probing and measuring contours of surfaces) as an STM, AFM, or NSOM device, comprising a fiber having a relatively thick upper cylindrical region terminating in a tapered region that terminates in a relatively thin right cylindrical lower region, i.e., with straight vertical sidewalls. The lower cylindrical region advantageously has a maximum width in the approximate range of 0.05 µm to 150 µm, and it terminates at its bottom extremity in an essentially planar end surface oriented perpendicular to the axis of the thin right cylindrical region. As used herein, the term "maximum width" refers to the maximum diameter—i.e., the length of the longest line segment that can be drawn in a cross section of a cylindrical region of a fiber segment, the line segment being oriented perpendicular to the axis of the cylinder, from one extremity of the cross section to another. In the case of a circular cylindrical region, the width (=diameter) in any direction of each such cross section is thus equal to this maximum width. Also, as used herein the term "approximate" has its ordinary meaning in accordance with significant figures.

The invention also involves methods of making such a probe device and then using it for surface metrological purposes such as STM, AFM, or NSOM—i.e., making the probe device and moving it across the surface of a sample body whose contours are to be measured.

The fact that the lower region of the probe device terminate in a planar end surface—advantageously oriented perpendicular to the axis of the cylinder—enables accurate positioning and hence position—determinations of the probe at locations of a surface of the sample body being scanned by the probe, even at sudden jumps in the surface. And the fact that the lower region of the probe device has the form of a cylinder simplifies the determination of the profile of the surface of the sample body. The probe's sidewalls advantageously are coated with a suitable layer, such as an optically reflecting layer, for confinement of the light inside the fiber probe tip especially if and when the probe is used for probing as an NSOM device—i.e., if and when the probe device is moved with its tip (lowest extremity) maintained at successive distances from a surface of a sample body where the forces exerted by the sample body on the probe device are mutually equal.

Only for the sake of clarity, none of the FIGURES are drawn to any scale.

DETAILED DESCRIPTION

Figure 1:
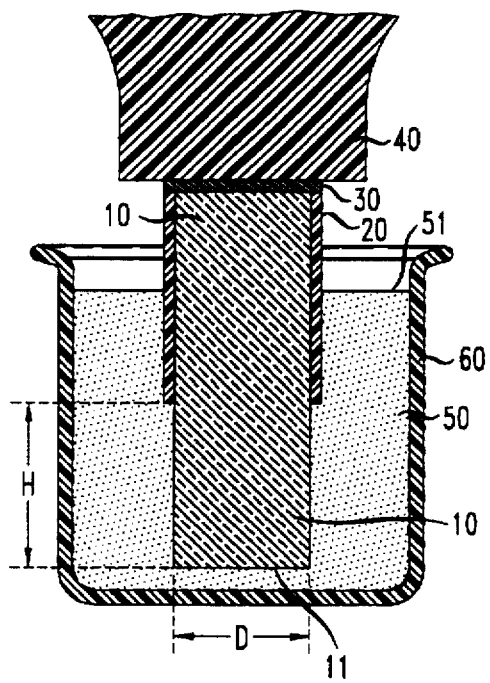
FIGS. 1–4 depict elevational cross-section diagrams of a probe device with straight vertical sidewalls being fabricated in accordance with a specific embodiment of the invention.

Referring to FIG. 1, a fiber segment 10, typically an optical fiber segment, typically takes the form of a solid right circular cylinder. A top portion of the cylindrical sidewall surface of this segment 10 is coated with a polymer resist layer 20 that is resistant to hydrofluoric acid etching, whereby a lower portion (having a predetermined height H) is not coated. The glass fiber segment 10 has a bottom endface 11 that is flat and is oriented in a plane perpendicular to the axis of the (cylindrical) segment 10. The segment 10 is firmly attached to a holder 40, typically made of teflon, by a thin segment 31 of suitable material coated with an adhesive, such as a segment of adhesive tape.

Advantageously, the polymer resist layer 20 is a chlorofluorocarbon polymer dissolved in an organic solvent typically comprising a ketone or an ester or a mixture of a ketone and an ester. For example, the polymer resist is a copolymer formed by polymerizing vinylidene fluoride and chlorotrifluoroethylene commercially available as a resin from 3M Corporation under the tradename "KEL-F" Brand 800 Resin, which is dissolved in amyl acetate or other suitable organic solvent to the extent of approximately 30-to-50 wt percent resin.

The material of the fiber segment 10 can be, but need not be, uniform. For example, it can have a central core surrounded by a peripheral cladding as known in the art of optical fibers. At any rate, the material of the fiber segment 10 typically is circularly symmetric. The fiber segment 10 is immersed (FIGS. 1 and 2) in a wet essentially isotropic etch, typically a buffered oxide etching solution 50—such as a solution composed of 2 parts (7:1) buffered oxide etch, 1 part hydrofluoric acid, 1 part acetic acid, and 1 part $H_2O$. As used herein, the term "essentially isotropic etching" refers to those cases in which the etching rates in the axial and radial directions do not differ from each other by more than approximately 10 per cent.

The acetic and $H_2O$ components of the solution 50 help dissolve the accumulation of unwanted residual material on the fiber surface during etching. The etching solution 50 is contained in a container 60, and it has a level 51 that intersects the polymer layer 20 at a predetermined height, whereby the entire (lower) portion of the surface of the fiber segment 10 that is not coated with the polymer layer 20 is submerged in the solution 50.

Figure 2:
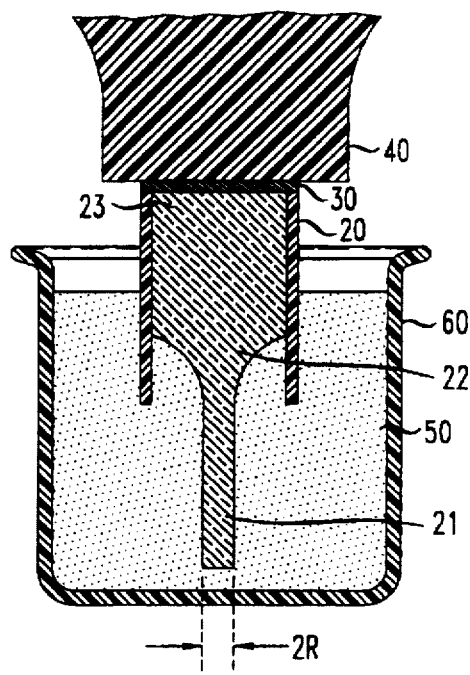

After the fiber segment 10 has been immersed in the etching solution 50 for a predetermined mount of time, it assumes the shape shown in FIG. 2—that is, a relatively thick upper region 23, in the form of a solid right circular cylinder, terminating in tapered intermediate (transition) region 22, in the form of a tapered solid circular region, and terminating in a relatively thin lower cylindrical region 21, in the form of another solid right circular cylinder.

The purpose of the polymer layer 20 is to create an etching boundary that is spaced from the air-to-etching-solution interface whereby a shorter undercut portion 20 enhances the overall stability of the probe.

For example, the height (length) H (FIG. 1) of the bottom portion of the fiber segment 10, which is not coated with the polymer resist layer 20, is typically equal to approximately 2.5 cm; and the diameter D (FIG. 1) of the fiber segment 10 is typically equal to approximately 125 µm or more. After having been etched with the solution 50, the thin lower region 21 has a diameter 2R (FIG. 2) typically equal to approximately 30 µm or more, as determined by the duration of the immersion.

Next, the bottom face of this lower region 21 is cleaved in a plane oriented perpendicular to the (common) axes of the upper region 23 and the lower region 21, as by means of a fiber cleaver aided by optical microscopic viewing or other micrometer controlled procedure. In this way, the height of the lower cylindrical region 24 becomes reduced to a predetermined value h (FIG. 3), and the tip thereof is a planar surface oriented perpendicular to the axis of this lower cylindrical region 24. This height h is typically in the approximate range of 0.05 µm to 30.0 µm advantageously in the approximate range of 1 µm to 10 µm. The polymer layer 20 is then removed ("stripped"), or it can be removed prior to the cleaving. More specifically, some (or all) of the polymer resist layer 20 is removed such as by immersion in acetone, whereby a residual polymer resist layer 25 remains (or not).

Figure 4:
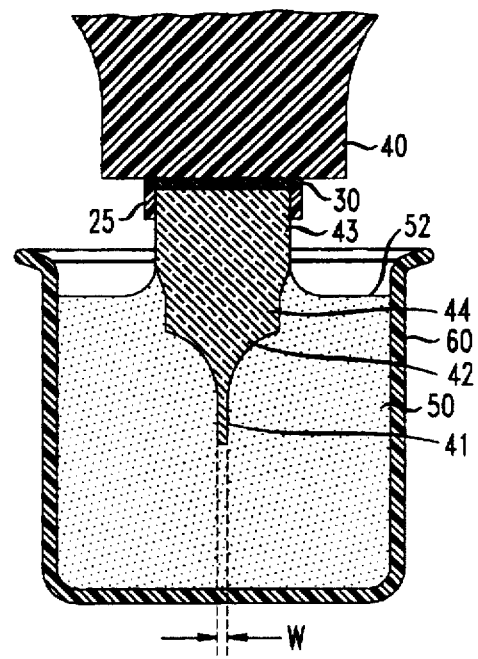

The fiber segment again is immersed (FIG. 4) in the essentially isotropic etching solution 50, for another predetermined amount of time, to a solution level 52 that intersects the segment at a level located typically above the top of the tapered region 22 and that isotropically etches those portions of the fiber with which it comes in contact. In this way another intermediate solid cylindrical region 44 formed; and the resulting lower region 41 of the fiber segment is still a solid right circular cylinder but having a reduced diameter equal to w, but the height h thereof is not reduced by a significant amount. That is to say, the height h remains essentially unchanged. At the same time, the diameters of the various portions of the resulting tapered intermediate region 42 of the fiber segment are reduced. At the location of the solution level 52, at meniscus of the etching solution 50 produces a gradual tapered transition between regions of the fiber immediately above and immediately below the solution level 52, as indicated in FIG. 4.

The etching solution level 52 (FIG. 4) optionally can be adjusted to be the same as, or to be slightly below, the top of the tapered, intermediate region 22. In such a case, there will be no intermediate cylindrical region 44. The lower region 41, intermediate region 42, the intermediate region 44 (if any), and upper region 43 thus all take the form of mutually coaxial solid cylinders, typically circular cylinders. The diameter w of the lower portion 41—i.e., the width of the tip of the resulting probe (FIG. 4)—can be adjusted to any desired value by adjusting the amount of time during which the immersion in the solution 50 is allowed to continue. This width w can be made in the approximate range of 0.01 µm and 150 µm, typically approximately 0.05 µm to 0.5 µm, and advantageously in the approximate range of 0.05 µm to 0.2 µm—depending on the ultimately desired metrological use of the probe when measuring sample surfaces, i.e., depending on the desired metrological resolution of the measurements to be made by the fiber during its subsequent use as a probe device.

Typically, such metrological use involves scanning the surface of a sample body with the probe while holding the probe with an electromechanical feedback servo-mechanism, as known in the art, all of which distances are characterized by mutually equal components of force (for the case of AFM) in the direction perpendicular to the overall surface of the sample body.

The predetermined time durations of the immersions for the etchings (FIGS. 1–2 and 4) can be determined by trial and error.

Figure 5:
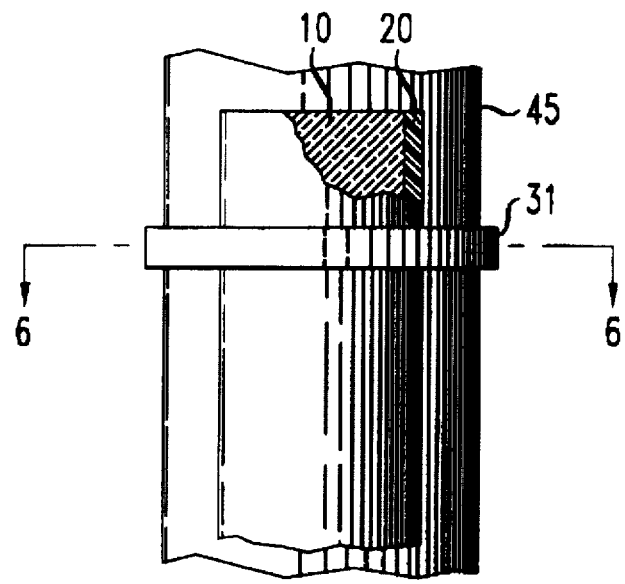
FIGS. 5 and 6 depict elevational and horizontal cross-section diagrams, respectively, of a probe device in an early stage if its fabrication in accordance with another specific embodiment of the invention.
Figure 6:
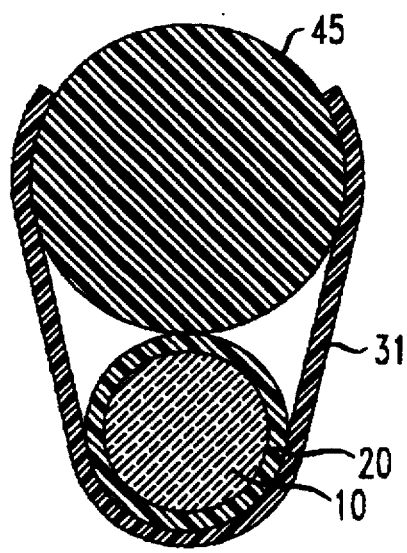

FIGS. 5 and 6 depict an alternative manner by which the fiber segment 10 can be held. Specifically, the fiber segment 10 is not coated with the polymer resist layer 20, and it is held in place by a segment of adhesive tape 31 that is affixed to a holder 45. This holder 45 can be the same as the holder 40 previously described. In such a case, immersion of the fiber segment in the solution 50 causes a meniscus to form between the solution 50 and the fiber segment 10, whereby the lower region 21 and the intermediate region 22 are defined.

Figure 3:
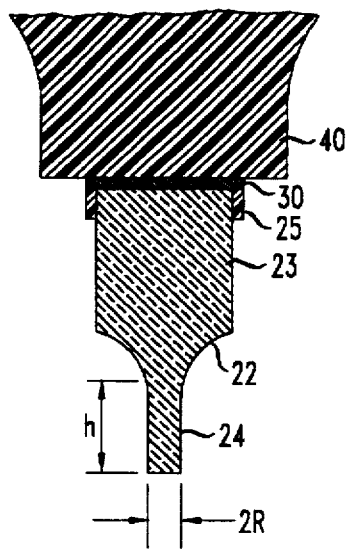

The above-described method of probe device fabrication does not rely on a doping profile of the fiber segment 10 or the composition of the etching solution 50 (FIG. 4). The cylindrical tip is formed by reducing the diameter of the fiber primarily by the second etching (FIG. 4) in the radial direction. The flat end face results from the cleaving step (FIG. 3). Throughout the second etching step (FIG. 4), the lower region 41 maintains its shape, even as its dimensions (in all directions) decrease. Any structures created on the bottom endface, such as a cone or point, are eliminated as the diameter w becomes smaller than approximately 1 µm. For large diameters, the formation of features on the end face is prevented by the cleaving step (FIG. 3) because not enough etching occurs in the axial direction to produce a significant variation in the amount of etching at different radii of the fiber. If a large amount of etching in the axial direction is desired, a flat endface can still be achieved by using a fiber segment with uniform doping profile or (even in the presence of a radial gradient of doping concentration in the fiber segment) by properly adjusting the concentration of the chemical components of the etching solution, or by doing both.

Although the invention has been disclosed in detail in terms of a specific embodiment, various modifications can be made without departing from the scope of the invention. For example, instead of optical fiber, the fiber segment 10 can be made of any material that can be etched as described above, and that can be cleaved to form a (planar) tip. The wet etching can be enhanced by ultrasonic agitation. Instead of isotropic wet etching, other kinds of etching techniques can be used, such as dry plasma etching. The etchings are advantageously, but need not be, isotropic. The two etchings (FIGS. 1–2 and 4) can be chemically different or physically different (i.e., can be essentially isotropic dry etching in any of the etchings, at some sacrifice of fabrication speed). The etchings indicated in FIGS. 1–2 and FIG. 4 preferably are both, but need not be, essentially isotropic.

For use as an NSOM device, the sidewalls of the regions 41 and 42 advantageously are coated with an optically reflecting layer such as a metallic layer like chromium, or the fiber segment 10 has a core region and a cladding region as known in the art (whereby the cladding region reflects optical radiation during the NSOM use), or both.

In case the fiber segment 10 (FIG. 1) has a cladding as well as a core, advantageously—for use in an AFM device wherein the cladding is optional, an STM device wherein the cladding is optional, or an NSOM device wherein the cladding is described—the diameter of the core (in which the chemical composition is uniform) is larger than w (FIG. 4) by an amount in the approximate range of 2.5-to-3.5 µm.

The shape of the cross section of the fiber segment 10 can be other than circular—such as elliptical, rectangular, or square—as can be obtained by cutting a glass body into such a shape. In such a case, the cross section of each cylindrical region has a maximum and a minimum width that differ from each other.

We claim:

1. A probe device comprising:
   a fiber segment having a relatively thick upper cylindrical region terminating in a tapered region that terminates in a relatively thin right cylindrical lower region; the lower cylindrical portion having a maximum width in the approximate range of 0.01 µm to 150 µm and terminating at its bottom extremity in an essentially planar end surface oriented perpendicular to the axis of the thin right cylindrical region.

2. The probe device of claim 1 in which the thin cylindrical region has a height in the approximate range of 0.05 µm to 30 µm.

3. The probe device of claim 1 in which the thin cylindrical region has a height in the approximate range of 1 µm to 10 µm.

4. The probe device of claim 1 in which the maximum width of the thin cylindrical region is in the approximate range of 0.05 µm to 0.2 µm.

5. The probe device of claim 1 in which the maximum width of the thin cylindrical region is in the approximate range of 0.05 µm to 0.5 µm.

6. The probe device recited in claim 1 further including a metallic layer located on the sidewall of the lower cylindrical region.

7. A metrological method including moving the probe device recited in claims 1, 2, 3, 4, 5, or 6 across a surface of a sample body.

8. A probe device comprising:
   a fiber segment having a relatively thick upper cylindrical region terminating in a tapered region that terminates in a relatively thin right cylindrical lower region; the thin right cylindrical lower region having a maximum width in the approximate range of 0.01 μm to 150 μm and terminating at its bottom extremity in an essentially planar end surface oriented perpendicular to the axis of the thin right cylindrical lower region, the fiber segment having at most one other right cylindrical region, said at most one other right cylindrical region being located above the thick upper cylindrical region, said at most one other right cylindrical region, said thin right cylindrical lower region, and said relatively thick upper cylindrical region having respective maximum widths that are mutually different from each other.

9. The probe device of claim 8 in which the thin cylindrical region has a height in the approximate rnge of 0.05 μm to 30 μm.

10. The probe device of claim 8 in which the thin cylindrical region has a height in the approximate rnge of 1 μm to 10 μm.

11. The probe device of claim 8 in which the maximum width of the thin cylindrical regionis in the approximate rnge of 0.05 μm to 0.2 μm.

12. The probe device of claim 9 in which the maximum width of the thin cylindrical regionis in the approximate rnge of 0.05 μm to 0.2 μm.

13. The probe device of claim 8 further including a metallic layer located on the sidewall of the lower cylindrical region.

14. A metrological method including moving the probe device recited in claims 8, 9, 10, 11, 12, or 13 across a surface of a sample body.

* * * * *